2,806,850
Patented Sept. 17, 1957

2,806,850

1 - (2 - ETHYL - 1,2,3,4 - TETRAHYDROISOQUINO-LINIUM) - 3 - (TRIMETHYLAMMONIUM) - PROPANE DISALTS

Chester John Cavallito and Allan Poe Gray, Decatur, Ill., assignors to Irwin, Neisler and Company, Decatur, Ill., a corporation of Illinois No Drawing. Application August 30, 1955,
Serial No. 531,577

6 Claims. (Cl. 260—286)

This invention relates to organic compounds and is more particularly concerned with 1-(2-ethyl-1,2,3,4-tetrahydroisoquinolinium) - 3 - (trimethylammonium)-propane disalt having the structure:

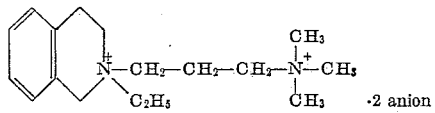

·2 anion

In a prior co-pending application, of which this application is a continuation-in-part, Serial 425,730, filed April 21, 1954; we disclosed a number of bis-quaternary ammonium salts which were useful as hypotensive agents. Those materials show outstanding utility as hypotensive agents. Their mechanism of operation is apparently through a central action with some concomitant ganglionic blockade. When utilized clinically, this ganglionic blockade provides certain side-effects to the desired hypotensive activity, including dilation of the pupils, dryness of the mouth, nausea, dizziness, et cetera. However, unexpectedly, one compound within the scope of the broad invention above-defined, did not show the usual side-effects noted with ganglionic blockade-type mechanism of action. Thus, the 1-(2-ethyl-1,2,3,4-tetrahydroisoquinolinium)-3-(trimethylammonium)-propane disalts did not show dilation of the pupil, nausea, dizziness, constipation or dryness of the mouth usually associated with this type of material. At the same time, its hypotensive activity was of a high degree and afforded an additional advantage by providing a floor level of hypotension, that is, after a given point in the lowering of blood pressure had been accomplished, the administration of additional amounts did not cause additional reduction of the blood pressure. In direct contrast to most of the materials which have been thus far provided, this one advantage is particularly important because careful administration and dosage is not as acutely required in the administration of this material as it was with all of the prior art materials. Further, a next lower homologue, 1-(2-methyl-1,2,3,4-tetrahydroisoquinolinium) - 3 - (trimethylammonium) - propane dibromide did show these usual side-effects.

The compounds of the present invention are high-melting solids, appreciably soluble in isopropyl alcohol, and soluble in water.

Preparation of the compounds of the present invention is readily accomplished by providing a 3-halopropyltrimethylammonium salt and reacting this material with N-ethyltetrahydroisoquinoline. The halogen of the propylammonium compound may be chlorine, bromine or iodine, and the anion may be any non-toxic, stable anion, such as, for example, chloride, bromide, iodide, citrate, sulfate, nitrate, et cetera. The reaction is usually carried out in the presence of a solvent, and representative solvents which are suitable include, for example, acetonitrile, an alcohol such as ethyl alcohol, isopropyl alcohol, propyl alcohol, isoamyl alcohol, et cetera, mixtures of dioxane and a suitable alcohol, and similar polar solvents and solvent mixtures. The reaction is usually conducted at a temperature from about room temperature to about 150 degrees centigrade, however, other temperatures may be employed. A temperature of about 80 degrees centigrade is preferred. Generally, approximately equimolecular portions of the reactants are used, however, an excess of one reactant or the other may be employed if desired. After heating the mixture, the compounds of the present invention begin to precipitate and settle out from the reaction mixture. In the event no precipitation occurs, ether may be added to the reaction mixture to cause precipitation. Purification may be readily accomplished by recrystallization in conventional manner.

Another method of preparation which may be used, if desired, involves the reaction of a 2-(3-halopropyl)-2-ethyl-1,2,3,4-tetrahydroisoquinolinium salt, wherein the halogen may be chlorine, bromine or iodine, with trimethylamine. Contact of the reactants is usually sufficient to initiate reaction, and because the amine is gaseous, pressure equipment is desirable. The halopropyl material is usually dissolved in an appropriate solvent, such as those previously defined, and elevated temperatures will decrease the time required for complete reaction. Separation and purification is accomplished in the same manner described above.

The following preparations are given to illustrate certain methods of preparation of the intermediate compounds of the present invention, but are not to be construed as limiting the invention thereto.

PREPARATION 1

Anhydrous trimethylamine was slowly bubbled into a stirred solution, at room temperature, of 135 grams (0.67 mole) of 1,3-dibromopropane in 300 milliliters of benzene until 26.4 grams (0.45 mole) of the trimethylamine had been absorbed. This absorption required approximately five hours. After allowing the mixture to stand for 16 hours, the precipitate was separated by filtration. There was thus obtained 99.5 grams (85 percent of the theoretical yield) of 3-bromopropyltrimethylammonium bromide, as a white crystalline solid, melting, with decomposition, at 205 degrees centigrade.

Analysis:
Calculated: Bromine (ionic), 30.61
Found: Bromine (ionic), 30.93

PREPARATION 2

Into a solution of 63.0 grams (0.4 mole) of 1-bromo-3-chloropropane in 600 milliliters of benzene was bubbled 23.6 grams (0.4 mole) of anhydrous trimethylamine. After 16 hours at room temperature, the precipitate was collected. There was thus obtained 80.0 grams (92 percent of the theoretical yield) of 3-chloropropyltrimethylammonium bromide, melting, with decomposition, at 206 degrees centigrade.

Analysis:
Calculated: Bromine (ionic), 36.90
Found: Bromine (ionic), 36.58

The following examples are given to illustrate processes whereby the compounds of the present invention may be prepared; however, said examples are not to be construed as limiting the invention thereto.

Example 1

A solution of 1,610 grams (10 moles) of N-ethyltetrahydroisoquinoline and 2,610 grams (10 moles) of 3-bromopropyltrimethylammonium bromide in 6 liters of isopropyl alcohol was refluxed, with stirring, for 6 hours and allowed to cool to room temperature overnight. The crystalline precipitate was recrystallized from isopropyl alcohol to yield 3,320 grams (79 percent of the theoretical yield) of 1 - (2 - ethyl - 1,2,3,4 - tetrahydroisoquinolinium) - 3 - (trimethylammonium) - propane dibromide melting, with decomposition, at 247 degrees centigrade.

Analysis:
Calculated: C, 48.35; H, 7.17; Br, 37.85
Found: C, 48.55; H, 7.33; Br, 37.66.

*Example 2*

A solution of 600 grams of the product of Example 1 in 12 liters of methanol was passed through a methanol-washed column (7.5 centimeters in diameter by 85 centimeters high) of Amberlite IRA 401 (Rohm and Haas) in the neutral, chloride salt form. The eluate was concentrated to dryness and the residue was recrystallized from ethanol-ethyl acetate to yield 470 grams (99 percent of the theoretical yield) of 1-(2-ethyl-1,2,3,4-tetrahydroisoquinolinium) - 3 - (trimethylammonium)-propane dichloride, melting, with decomposition, at 249 degrees centigrade.

Analysis:
Calculated: Cl, 21.27
Found: Cl, 20.94

*Example 3*

A solution of 21.7 grams (0.1 mole) of 3-chloropropyltrimethylammonium bromide and 16.1 grams (0.1 mole) of N-ethyltetrahydroisoquinoline in 100 milliliters of isopropyl alcohol was refluxed for about 40 hours. The precipitate, which crystallized from the cooled solution, was recrystallized from n-propyl alcohol to give 15.8 grams of 1-(2-ethyltetrahydroisoquinolinium)-3-(trimethylammonium) - propane monochloride monobromide, melting, with decomposition, at 242 degrees centigrade.

A solution of 5.7 grams of this salt in 500 milliliters of methanol was passed through a methanol-washed column (4.5 centimeters in diameter by 55 centimeters high) of Amberlite IRA 401 (Rohm and Haas) in the chloride salt form. The eluate was concentrated to dryness and the residue crystallized from ethanol-ethyl acetate to yield 4.5 grams (90 percent in the anion exchange step) of 1 - (2 - ethyl - 1,2,3,4 - tetrahydroisoquinolinium) - 3 - (trimethylammonium)-propane dichloride, melting, with decomposition, at 249 degrees centigrade, this being the same product as that obtained in Example 2, supra.

Analysis:
Calculated: Cl, 21.27
Found: Cl, 20.91

*Example 4*

A solution of 4.0 grams of the product described in Example 1, in one liter of methanol was passed through a column (3.5 centimeters in diameter by 40 centimeters high) of methanol-washer Amberlite XE–67 (reground IRA 400, Rohm and Haas) in the basic, hydroxide form. The eluted solution of 1-(2-ethyl-1,2,3,4-tetrahydroisoquinolinium) - 3 - (trimethylammonium) - propane dihydroxide was neutralized with an ethanol solution of tannic acid to precipitate 10 grams (after drying at 80 degrees centigrade, in vacuo) of the corresponding tannate salt as a tan powder, melting with preliminary softening and decomposition, at 185–190 degrees centigrade.

*Example 5*

An eluted methanol solution of 1-(2-ethyl-1,2,3,4-tetrahydroisoquinolinium) - 3 - (trimethylammonium)-propane dihydroxide obtained, as in Example 4, from 4.0 grams of the dibromide (Example 1) was acidified with ethereal hydrogen chloride. The solution was concentrated almost to dryness and diluted with isopropyl alcohol and methyl ethyl ketone to yield 2.7 grams (86 percent of the theoretical yield) of the dichloride salt, melting, with decomposition, at 249 degrees centigrade. The material is identical with the product described in Example 2.

Analysis:
Calculated: Cl, 21.27
Found: Cl, 21.14

*Example 6*

A benzene solution of one equivalent of N-ethyltetrahydroisoquinoline and one equivalent of 1-bromo-3-chloropropane may be refluxed on a steam bath for eight hours to yield a precipitate of 2-(3-chloropropyl)-2-ethyl-1,2,3,4-tetrahydroisoquinolinium bromide.

Into an ethanol solution of one equivalent of this product, cooled in an ice bath, is bubbled two equivalents of anhydrous trimethylamine and the solution is then heated in a pressure bottle at 80 degrees centigrade for 24 hours. Dilution of the cooled solution with ether yields a precipitate of 1-(2-ethyl-1,2,3,4-tetrahydroisoquinolinium)-3-(trimethylammonium)-propane monochloride monobromide, identical with the material described by the process of Example 3.

Other anions which are stable and non-toxic and which may be substituted for those specifically shown in the above examples include the tartrate, gluconate, fumarate, nitrate, sulfate, citrate, acetate, iodide, valerate, propionate, et cetera.

Various modifications may be made in the method and the compounds of the present invention without departing from the scope thereof and it is to be understood that we limit ourselves only as defined in the appended claims.

We claim:

1. 1 - (2 - ethyl - 1,2,3,4 - tetrahydroisoquinolinium)-3-(trimethylammonium)-propane salts wherein the anions are stable, non-toxic anions.

2. 1 - (2 - ethyl - 1,2,3,4 - tetrahydroisoquinolinium)-3-(trimethylammonium)-propane dibromide.

3. 1 - (2 - ethyl - 1,2,3,4 - tetrahydroisoquinolinium)-3-(trimethylammonium)-propane dichloride.

4. 1 - (2 - ethyl - 1,2,3,4 - tetrahydroisoquinolinium)-3-(trimethylammonium)-propane monochloride monobromide.

5. 1 - (2 - ethyl - 1,2,3,4 - tetrahydroisoquinolinium)-3-(trimethylammonium)-propane tannate.

6. 1 - (2 - ethyl - 1,2,3,4 - tetrahydroisoquinolinium)-3-(trimethylammonium)-propane dihydroxide.

References Cited in the file of this patent

UNITED STATES PATENTS 2,271,378    Searle _____ Jan. 27, 1942